US010146054B2

(12) United States Patent
Martinez et al.

(10) Patent No.: US 10,146,054 B2
(45) Date of Patent: Dec. 4, 2018

(54) ADDING PRESCRIPTIVE CORRECTION TO EYEPIECES FOR SEE-THROUGH HEAD WEARABLE DISPLAYS

(71) Applicant: Google Inc., Mountain View, CA (US)

(72) Inventors: Oscar A. Martinez, Mountain View, CA (US); Ozan Cakmakci, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 14/792,084

(22) Filed: Jul. 6, 2015

(65) Prior Publication Data
US 2017/0010465 A1    Jan. 12, 2017

(51) Int. Cl.
*G02B 27/14*    (2006.01)
*G02B 27/01*    (2006.01)
(Continued)

(52) U.S. Cl.
CPC ....... *G02B 27/0172* (2013.01); *G02B 27/017* (2013.01); *G02C 7/02* (2013.01);
(Continued)

(58) Field of Classification Search
CPC ............ G02B 27/0093; G06K 9/00255; G02C 11/10
(Continued)

(56) References Cited

U.S. PATENT DOCUMENTS 4,218,111 A    8/1980  Withrington et al.
4,220,400 A    9/1980  Vizenor
(Continued)

FOREIGN PATENT DOCUMENTS

CN    104536139 A    4/2015
EP    0 898 726 B1    3/2000
(Continued)

OTHER PUBLICATIONS

Cakmakci, O. et al., "Head-Worn Displays: A Review", IEEE, Journal of Display Technology, vol. 2, No. 3, Sep. 2006, pp. 199-216.
(Continued)

*Primary Examiner* — Stephone B Allen
*Assistant Examiner* — Travis Fissel

(57) ABSTRACT

An eyepiece for a head wearable display includes a curved lightguide component, a curved see-through component, an output coupler, and a prescription layer. The curved lightguide component guides display light received at an input region and releases the display light along an eye-ward direction in a viewing region. The output coupler is disposed at the viewing region to redirect the display light towards the eye-ward direction for output from the curved lightguide component. The output coupler is at least partially transmissive to ambient light incident through a world-facing side such that the viewing region is see-through. The curved see-through component is mated to the world-facing side of the curved lightguide component. The prescription layer has a first side mated to an eye-facing side of the curved lightguide component and a second side having a curvature that introduces prescriptive lensing to both the ambient light and the display light.

20 Claims, 8 Drawing Sheets

(51) Int. Cl.
*G02C 7/02* (2006.01)
*G02C 11/00* (2006.01)
*G02B 6/00* (2006.01)

(52) U.S. Cl.
CPC .............. *G02C 11/10* (2013.01); *G02B 6/00* (2013.01); *G02B 2027/011* (2013.01); *G02B 2027/0178* (2013.01); *G02B 2027/0194* (2013.01)

(58) Field of Classification Search
USPC ................. 359/630, 631, 632, 633; 345/632
See application file for complete search history.

(56) References Cited

U.S. PATENT DOCUMENTS

| | | |
|---|---|---|
| 4,560,233 A | 12/1985 | Banbury |
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A * | 11/2000 | Droessler ............ G02B 27/0172 359/633 |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 7,944,616 B2 | 5/2011 | Mukawa |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,639,072 B2 | 1/2014 | Popovich et al. |
| 8,665,178 B1 | 3/2014 | Wang |
| 8,848,289 B2 | 9/2014 | Amirparviz et al. |
| 8,964,298 B2 | 2/2015 | Haddick et al. |
| 8,989,535 B2 | 3/2015 | Robbins |
| 9,013,793 B2 | 4/2015 | Gupta et al. |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0149201 A1 | 6/2011 | Powell et al. |
| 2011/0193814 A1 | 8/2011 | Gay et al. |
| 2011/0213664 A1 | 9/2011 | Osterhout et al. |
| 2011/0221656 A1 | 9/2011 | Haddick et al. |
| 2012/0162549 A1 | 6/2012 | Gao et al. |
| 2012/0212398 A1 | 8/2012 | Border et al. |
| 2012/0212399 A1 | 8/2012 | Border et al. |
| 2012/0249797 A1 | 10/2012 | Haddick et al. |

(56) References Cited

U.S. PATENT DOCUMENTS

| | | | |
|---|---|---|---|
| 2012/0293548 A1 | 11/2012 | Perez et al. | |
| 2013/0033756 A1 | 2/2013 | Spitzer et al. | |
| 2013/0101253 A1* | 4/2013 | Popovich | G02B 27/017 385/37 |
| 2013/0127980 A1* | 5/2013 | Haddick | G06F 3/013 348/14.08 |
| 2013/0182334 A1* | 7/2013 | Sugihara | G02B 27/0172 359/630 |
| 2013/0229712 A1 | 9/2013 | Kress | |
| 2013/0286178 A1* | 10/2013 | Lewis | A61B 3/113 348/78 |
| 2014/0026833 A1 | 1/2014 | Jensen et al. | |
| 2014/0063055 A1 | 3/2014 | Osterhout et al. | |
| 2014/0140654 A1 | 5/2014 | Brown et al. | |
| 2014/0254024 A1 | 9/2014 | Hiraide et al. | |
| 2015/0022784 A1* | 1/2015 | Tominaga | G02B 5/3083 353/20 |
| 2015/0062716 A1 | 3/2015 | Komatsu et al. | |
| 2015/0177519 A1 | 6/2015 | Cakmakci et al. | |
| 2017/0235144 A1* | 8/2017 | Piskunov | G02B 27/0172 359/13 |

FOREIGN PATENT DOCUMENTS

| | | |
|---|---|---|
| EP | 0 995 145 B1 | 9/2001 |
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 4550184 B2 | 9/2010 |
| WO | WO 96/05533 A1 | 2/1996 |
| WO | WO 2004/001484 A1 | 12/2003 |
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |
| WO | WO 2013/175465 A1 | 11/2013 |
| WO | WO 2015/059215 A1 | 4/2015 |
| WO | WO 2015/097169 A1 | 7/2015 |

OTHER PUBLICATIONS

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

Cakmakci, O. et al. "Design of a Freeform Single-Element Head-Worn Display", Proc. of SPIE vol. 7618, 761803, 2010, 6 pages.

Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.

Kress, B. et al., "Digital combiner achieves low cost and high reliability for head-up display applications", SPIE Newsroom. DOI: 10.1117/2.1200904.1599, May 2009, 3 pages.

Kress, B. et al., "Applied Digital Optics: From Micro-optics to Nanophotonics, Chapter 5: Digital Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/ Switchable Glass", retrieved from Internet Dec. 16, 2013, 1 page, http://www.kentoptronics.com/switchable.html.

Kent Optronics, Inc., Liquid Crystals for Photonics, "Liquid Crystal Switchable Mirror", 2 pages, http://www.kentoptronics.com , prior to Mar. 12, 2014.

Martinez, M. et al., "Segmented Diffractive Optical Elements for a Head Wearable Display", U.S. Appl. No. 13/930,845, filed Jun. 28, 2013, whole document.

Cakmakci, O. et al., "Eyepiece for Head Wearable Display Using Partial and Total Internal Reflections", U.S. Appl. No. 14/139,277, filed Dec. 23, 2013, whole document.

Luttmann, A.M. et al., "Eyepiece With Switchable Reflector for Head Wearable Display", U.S. Appl. No. 14/209,995, filed Mar. 13, 2014, whole document.

Martinez, O. et al., "Thin Curved Eyepiece for See-Through Head Wearable Display", U.S. Appl. No. 14/537,780, filed Nov. 10, 2014, whole document.

Cakmakci, O. et al., "Efficient Thin Curved Eyepiece for See-Through Head Wearable Display", U.S. Appl. No. 14/730,983, filed Jun. 4, 2015, whole document.

PCT/US2016/036772—International Search Report and Written Opinion, dated Sep. 9, 2016, 13 pages.

International Preliminary Report on Patentability dated Jan. 18, 2018 for PCT Application No. PCT/US2016/036772, 9 pages.

Notice of Allowance and Translated Allowed Claims for Taiwan Application No. 105121278, 9 pages.

Translation of First Examination Report and Office Action dated Nov. 2, 2017 for Taiwanese Application No. 105121278, 6 pages.

\* cited by examiner

ADDING PRESCRIPTIVE CORRECTION TO EYEPIECES FOR SEE-THROUGH HEAD WEARABLE DISPLAYS

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs. HMDs are likely to have broader adoption by the public, if they can effectively incorporate prescriptive correction for a wide variety of users with different prescriptive needs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for an eyepiece of a head wearable display that provide prescriptive lensing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
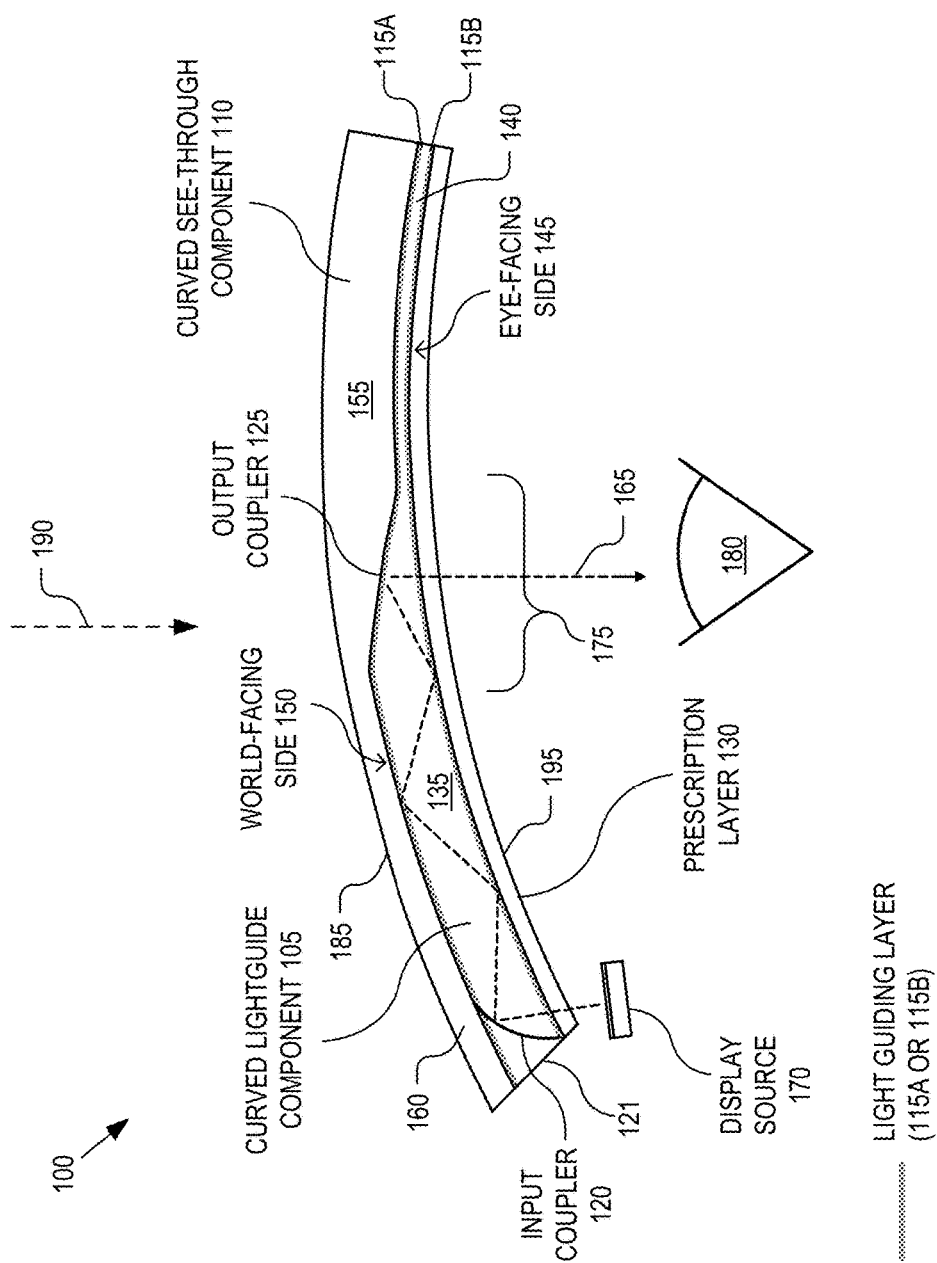
FIG. 1 illustrates an eyepiece including a prescription layer for a head wearable display, in accordance with a first embodiment of the disclosure.

FIG. 1 illustrates an eyepiece 100 for a head wearable display that provides prescriptive lensing, in accordance with a first embodiment of the disclosure. The illustrated embodiment of eyepiece 100 includes curved lightguide component 105, a curved see-through component 110, light guiding layers 115A and 115B (collectively 115), an input coupler 120, an output coupler 125, and a prescription layer 130. The illustrated embodiment of curved lightguide component 105 includes a thick portion 135, a thin portion 140, an eye-facing side 145, and a world-facing side 150. The illustrated embodiment of curved see-through component 110 includes a thick portion 155 and a thin portion 160.

Eyepiece 100 is well suited for use with head wearable displays that provide user specific prescriptive lensing. When integrated with a head wearable display, eyepiece 100 receives display light 165 generated by display source 170 at an input region (near input coupler 120) peripherally located from a viewing region 175 and emits display light 165 along an eye-ward direction in viewing region 175 toward a user's eye 180. Between input coupler 120 and output coupler 125 display light 165 is guided between light guiding layers 115 within curved lightguide component 105.

In one embodiment, light guiding layers 115 are clear adhesive layers that form a conformal bond between curved lightguide component 105 and the surrounding layers including curved see-through component 110 and prescription layer 130. These adhesive layers have a refractive index that is lower than a refractive index of curved lightguide component 105 to promote total internal reflection ("TIR"). In this embodiment, display light 165 is guided from the input coupler 120 to output coupler 125 entirely by TIR. To improve efficiency and reduce evanescent leakage, the low index adhesive layer should be a few wavelengths of display light 165 thick, or greater. As an example, curved lightguide component 105 may be fabricated of an optical grade plastic having a refractive index ranging between 1.5 to 1.7 while light guiding layers 115 may have a refractive index of approximately 1.3. In one embodiment, light guiding layers 115 may be fabricated of an optical grade adhesive, such as MY-131 provided by MY Polymers of Israel. Of course, other optical grade adhesives may be used.

In yet another embodiment, light guiding layers 115 are fabricated using angularly selective coatings. The angularly selective coatings may be implemented using a multi-layer film stack that substantially reflects display light 165 incident at sufficiently oblique angles while substantially transmitting display light 165 incident at near normal angles.

In the illustrated embodiment, display light 165 is incident through eye-facing side 145 and redirected by a reflective input coupler 120 down curved lightguide component 105 towards viewing region 175. However, in other embodiments, input coupler 120 may be omitted and edge surface 121 of curved lightguide component 105 operates as the input coupler for receiving display light 165 into curved lightguide component 105. In this edge input embodiment, display source 170 may be repositioned in front of edge surface 121. In some embodiments, edge surface 121 may be a curved surface (e.g., freeform surface) that imparts lensing power to display light 165 as it is received into curved lightguide component 105. In yet other embodiments (discussed below), input coupler 120 may be implemented using a variety of other structures (e.g., reflective surfaces, holograms, prisms, etc.) that redirect display light 165 along a trajectory within curved lightguide component 105 that causes TIR propagation down curved lightguide component 105 toward viewing region 175. In one embodiment, input coupler 120 is a mirror (e.g. silver coating or other reflective coating) having a freeform surface. Display light 165 is guided entirely via TIR or angularly selective reflection due to light guiding layers 115 from input coupler 120 to output coupler 125 where display light 165 is redirected out curved light guide component 105 via a final reflection off output coupler 125 at viewing region 175.

Output coupler 125 may be implemented using a variety of different structures that redirect display light 165 along an eye-ward direction. For example, output coupler 125 may be a partial reflector or beam splitter (e.g., thin silver coating, multilayer dielectric thin film, etc.) having a freeform surface. In one embodiment, output coupler 125 is more transmissive to visible light than it is reflective. For example, output coupler 125 may be implemented as 15% reflective and 85% transmissive. Of course, other reflective/transmissive ratios may be implemented. Accordingly, viewing region 175 is partially transmissive to ambient light incident through world facing surface 150 such that viewing region 175 is see-through.

In one embodiment, curved see-through component 110 is disposed across viewing region 175 to provide a complementary curvature along world facing surface 185 to offset the optical power of the curvature of eye-facing surface 145 encountered by ambient light. Furthermore, in one embodiment, curved see-through component 110 and curved lightguide component 105 are fabricated of the same transparent materials or transparent materials having substantially the same index of refraction. Thus, eyepiece 100 operates as an optical combiner, which combines ambient light 190 with display light 165 directed out viewing region 175 along an eye-ward direction into eye 180. In this way, eyepiece 100 is capable of displaying an augmented reality to eye 180; however, the combined curvatures of world facing surface 185 of curved see-through component 110 and eye-facing side 145 of curved lightguide component 105 complement each other and collectively do not impart lensing power to ambient light 190 as it passes through eyepiece 100 in viewing region 175.

In the illustrated embodiment of FIG. 1, prescription lensing is provided to both ambient light 190 and display light 165 via prescription layer 130. For example, a prescriptive curvature is formed into eye-facing side 195 of prescription layer 130. The prescriptive curvature is specified relative to the curvature of world-facing side 185. By fabricating prescription layer 130 out of a material having a refractive index that substantially matches curved lightguide component 105, the interface between prescription layer 130 and curved lightguide component 105, where light guiding layer 115B is disposed, has little or no lensing power on ambient light 190 and display light 165 exiting eyepiece 100 along the eye-ward direction.

Accordingly, user specific prescriptions can be provided by changing or modifying just prescription layer 130 while curved lightguide component 105 and curved see-through component 110 remain generic across all users. This technique enables the manufacture of a wide variety of prescriptions while maintaining a relative few skus for just prescription layer 130. For example, a handful of different prescription layers 130 (e.g., eight) may be fabricated that each have a base curvature formed into eye-facing side 195 that corresponds to a base diopter ranging from −4 diopters to +4 diopters. Eyepieces 100 may be fabricated and provided using this range of base diopters. When tailoring a specific eyepiece 100 to a specific user's prescription, the eyepiece 100 having the closest matching base diopter is selected and then sent to an ophthalmic lab to have the user's exact prescription ground into eye-facing side 195 of prescription layer 130.

Eyepiece 100 can be implemented as a thin, curved eyepiece having a thickness less than 8 mm. In one embodiment, curved lightguide component 105 alone has a thickness of about 3.5 mm when fabricated of a transparent material (e.g., OKP4HT-L, EP5000, polycarbonate, etc.) having an index of refraction of 1.64. The higher the refractive index the thinner the eyepiece can be designed. A direct benefit of using higher index material is to reduce the angle at which TIR occurs. This effectively enables designs that reduce the angle of the output coupler, which can either increase the size of the eyebox for a given lightguide thickness or reduce the overall thickness of the lightguide for a given eyebox size. Using higher index material for the eyepiece can also provide greater flexibility in the refractive index of the optical grade adhesives (e.g., light guiding layers 115) used to bond the components of eyepiece 100 together. The curvatures of both eye-facing surface 145 and world-facing surface 150 may be implemented as spherical surfaces. Collectively, the curvature and slim nature of eyepiece 100 provide a desirable industrial design that users requiring prescription lensing can enjoy. Eyepiece 100 not only has desirable industrial design, but is also efficient since the only lossy bounce for display light 165 traveling from input coupler 120 to output coupler 125 is the single redirection by output coupler 125 itself. This permits output coupler 125 to be substantially more transmissive than reflective thereby improving the see-through characteristic of eyepiece 100 in viewing region 175.

Although world-facing side 150 and eye-facing side 145 do not impart lensing power on ambient light 190 and eye-facing side 145 does not impart lensing power on display light 165 as it exits eyepiece 100 in viewing region 175, these surfaces do impart lensing power on display light 165 as it is guided down eyepiece 100 from the input region to viewing region 175. In one embodiment, world-facing side 150 and eye-facing side 145, along with input coupler 120 and output coupler 125 collectively impart lensing power on display light 165 as it is guided down eyepiece 100 from the input region to viewing region 175. This lensing power serves to magnify display light 165 so that the user can bring the near-to-eye image into focus. In one embodiment, world-facing side 150 and eye-facing side 145 have spherical curvatures while edge surface 121 (note, in this embodiment input coupler 120 is omitted and edge surface 121 operates as the input coupler as discussed above) and output coupler 125 may have freeform surfaces. In one embodiment where curved lightguide component 105 has a 1.64 refractive index, eye-facing surface 145 and world facing surface 150 have spherical radii of −118.5 mm and −120 mm, respectively. In this example, the freeform surfaces of edge surface 121 and output coupler 125 are defined by the following equations:

$$sag(x, y) = \frac{(1/R)(x^2 + y^2)}{1 + \sqrt{1 - (1/R^2)(x^2 + y^2)}} + \sum C_{m,n} x^m y^n, \quad \text{(Equation 1)}$$

where $C_{2,0}$=X2, $C_{1,1}$=X1Y1, $C_{0,2}$=Y2, etc. In this embodiment, edge surface 121 has a freeform shape defined by equation 1 with coefficient values of R=22.39 mm, Y2=3.12E-02, X3=−1.5E-03, XY2=−4.64E-03, and Y4= −6.5E-04. In this embodiment, output coupler 125 has a freeform shape defined by equation 1 with coefficient values of R=−57.135 mm, Y2=9.2E-04, X3=7.96E-05, XY2=7.14E-05, and a relative tilt of 32 degrees. Of course, other curvatures, freeform equations, coefficient terms and/or values and dimensions may be implemented.

In the illustrated embodiment, curved lightguide component 105 includes thick portion 135 and thin portion 140 while curved see-through component 110 includes thick portion 155 and thin portion 160. Output coupler 125 is disposed along the transition between the thick and thin portions. This configuration allows eyepiece 100 not only to have no visible seams across the entire eyepiece, but particularly no seams in viewing region 175.

In one embodiment, curved lightguide component 105 and curved see-through component 110 are fabricated using injection molded techniques using optical grade plastic. Once the components are bonded together using low index optical grade adhesive (e.g., light guiding layers 115), the two components can then be thinned to achieve the final thickness and precision curvatures on the outer surfaces. Thinning can be achieved using various grinding, milling, diamond turning, or other techniques. The prescription curvature of eye-facing side 195 may also be achieved using injection molding techniques followed by various grinding, milling, diamond turning, or other techniques, as well.

Figure 2:
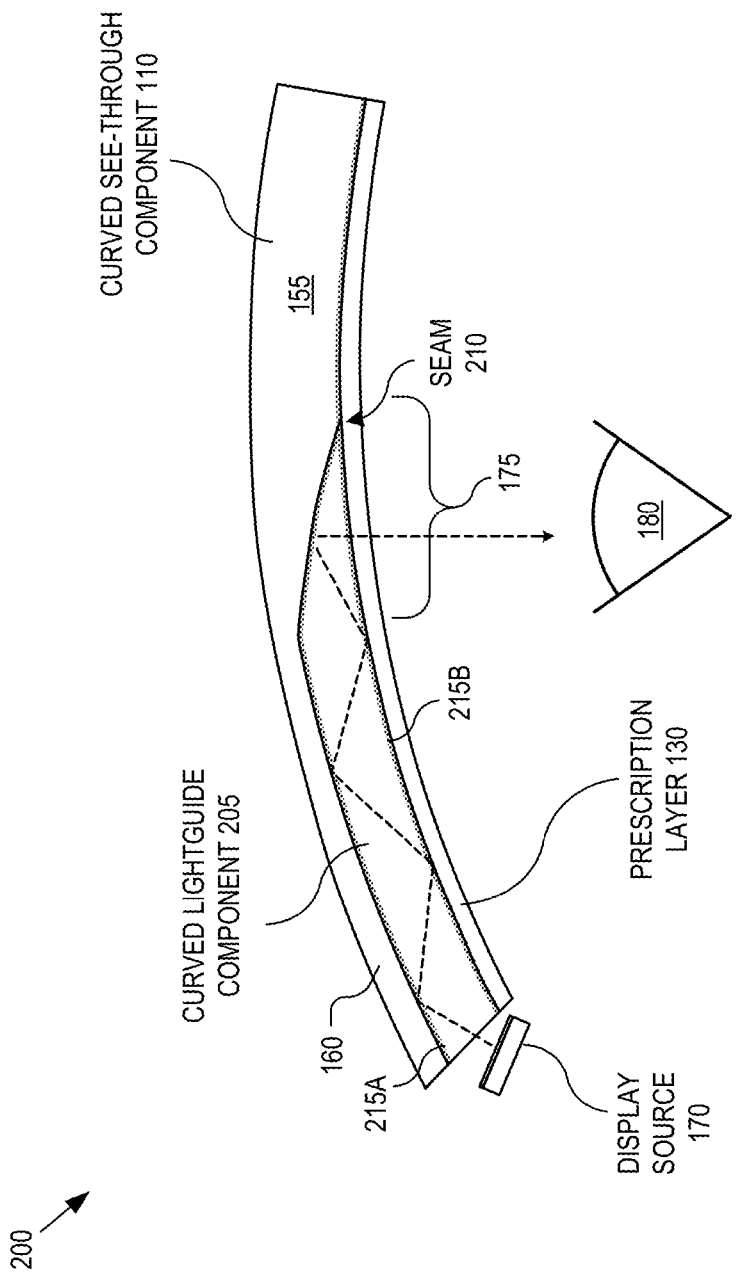
FIG. 2 illustrates an eyepiece including a prescription layer for a head wearable display, in accordance with a second embodiment of the disclosure.

FIG. 2 illustrates an eyepiece 200 including a prescription layer for use with a head wearable display, in accordance with another embodiment of the disclosure. Eyepiece 200 is similar to eyepiece 100 and operates in a similar manner except that curved lightguide component 205 does not include a thin portion. Fabricating curved lightguide component 205 without a thin portion can reduce the cost of fabrication, but does so at the expense of potentially introducing a visible seam 210 into viewing region 175. The appearance of seam 210 may be reduced via careful manufacturing to form a tight seam 210 between prescription layer 130, curved lightguide component 205, and curved see-through component 110, although the use of low refractive index clear adhesive to implement the light guiding layers 215A and 215B may still result in seam 210 being visible.

Figure 3:
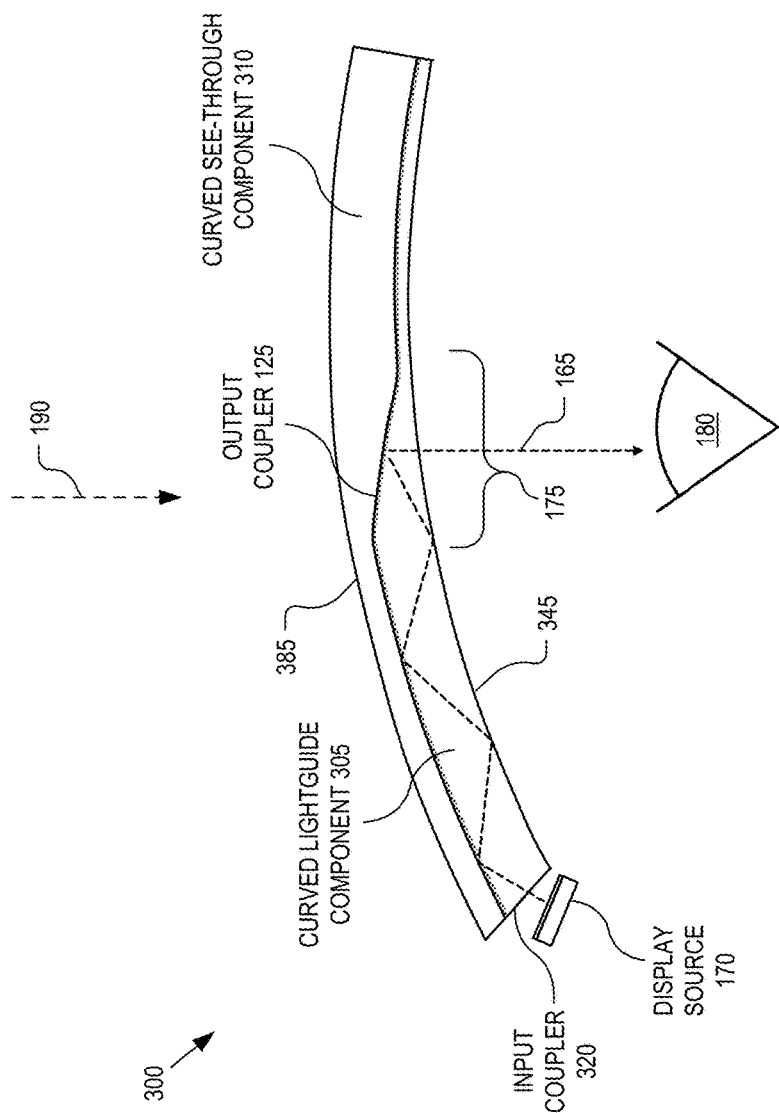
FIG. 3 illustrates an eyepiece including a prescriptive curvature formed on one or more surfaces for use with a head wearable display, in accordance with a third embodiment of the disclosure.

FIG. 3 illustrates an eyepiece 300 including a prescriptive curvature formed on one or more surfaces, in accordance with another embodiment of the disclosure. Eyepiece 300 is similar to eyepiece 100 and operates in a similar manner, except that prescription layer 130 is omitted and instead, prescriptive lensing is formed directly into world facing surface 385 of curved see-through component 310 and optionally into eye-facing side 345 of curved lightguide component 305. Forming the prescriptive curvatures directly into the external surfaces of curved lightguide component 305 and/or curved see-through component 310 can improve industrial design characteristics (e.g., keep eyepiece 300 thinner, improve clarity with fewer sandwich layers, etc.); however, does so at the expense of having to tailor curved see-through component 310 and optionally curved lightguide component 305 for each user. In one embodiment, the non-complementary curvatures of world facing surface 385 and eye-facing side 345 provide prescriptive lensing; however, the sum of the surfaces of curved lightguide component 305 encountered by display light 165 do not provide prescriptive lensing. In this embodiment, ambient light 190 is corrected but not display light 165. Accordingly, this solution may be well-suited for users with mild prescriptions or with near-sighted prescriptions, in which case the lensing power of input coupler 320, curved lightguide component 305, and output coupler 125 may be selected to place the virtual image of display light 165 at a distance that a typical near-sighted user can bring into focus without prescriptive lensing.

FIGS. 4A-4D illustrate various alternative examples of input couplers and output couplers that can be used in connection with the eyepiece designs (e.g., eyepieces 100, 200, or 300) described above, in accordance with embodiments of the disclosure. The illustrated examples are not intended to represent an exhaustive list of in-coupling and out-coupling solutions, but rather, a demonstrative list.

Figure 4A:
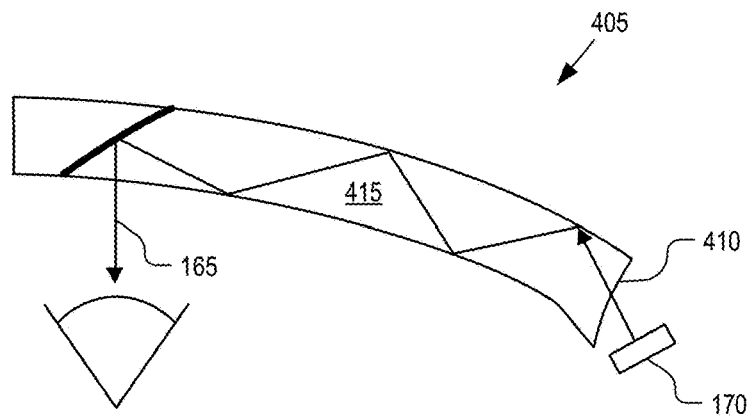
FIGS. 4A-4D illustrate various examples of input couplers and output couplers, in accordance with embodiments of the disclosure.

For example, FIG. 4A illustrates an eyepiece 405 where an input coupler 410 is formed as an input surface molded into an end of curved waveguide component 415. In other words, the display light 165 is not input through the eye-facing surface, but rather, through an end surface proximate to display source 170.

Figure 4B:
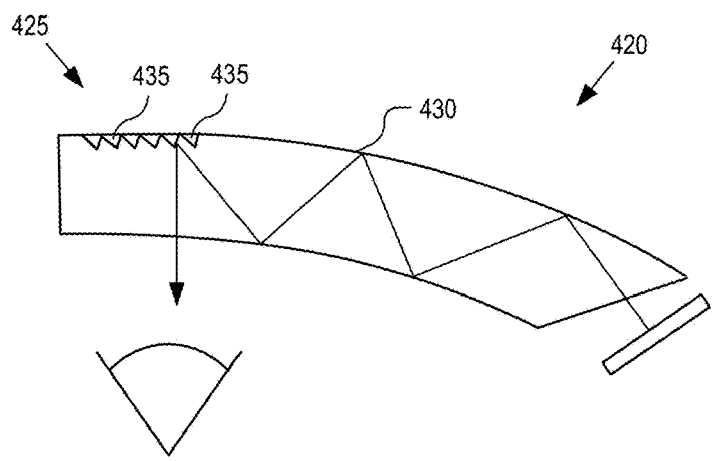

FIG. 4B illustrates an eyepiece 420 where the output coupler is formed as an array of prism structures 425 disposed along the world facing surface 430 in the viewing region. Prism structures 425 may be implemented as an array of small obliquely angled partially reflective surfaces. In the illustrated embodiment of FIG. 4B, a plurality of see-through wedges 435 are bonded to curved waveguide component 440 behind each reflective surface. Although not illustrated, in some embodiments, eyepiece 420 may further include an array of prism structures as an input coupler in the input region.

Figure 4C:
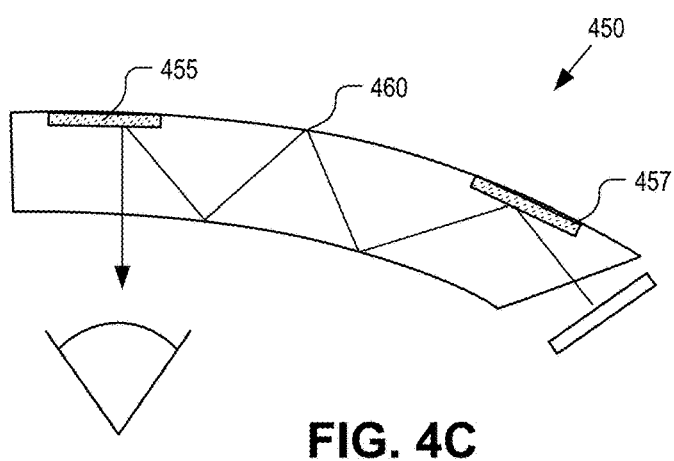

FIG. 4C illustrates an eyepiece 450 where the output coupler is formed as a hologram 455 disposed along the world facing surface 460 in the viewing region. FIG. 4C illustrates the inclusion of a reflective hologram 457 as an input coupler to provide color correction for chromatic aberrations induced by the output hologram 455.

Figure 4D:
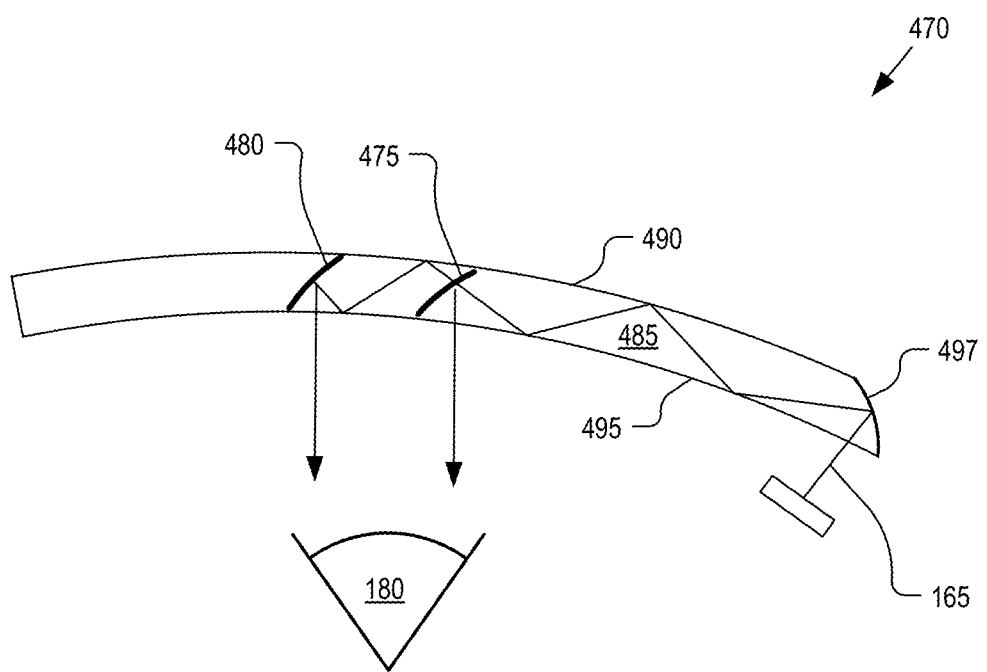

FIG. 4D illustrates an eyepiece 470 where the output coupler is formed as a pair of partially reflective mirror segments 475 and 480 disposed within curved waveguide component 485. Partially reflective mirror segments 475 and 480 operate to further expand the eyebox from which display light 165 can be viewed from eyepiece 470. In other words, mirror segments 475 and 480 reflect display light output from a single pixel in a manner that stitches the images reflected by each mirror segment 475 and 480 together at the viewing region to extend the eyebox from which a single pixel can be viewed. Partially reflective mirror segment 480 is disposed behind partially reflective mirror segment 475 such that display light 165 must first pass through partially reflective mirror segment 475 before reaching partially reflective mirror segment 480. In the illustrated embodiment, partially reflective mirror segments 475 and 480 are both curved freeform surfaces while world facing surface 490 and eye-facing surface 495 are spherical surfaces. In one embodiment, world facing surface 490 is a sphere with a radius of 90 mm and eye-ward facing surface 495 is a sphere with a radius of 92.5 mm. In one embodiment, partially reflective mirror segment 475 has a freeform shape defined by equations 2 and 3 below with coefficient values of $x^2=0.0035$, $y^2=0.0045$, with a relative tilt of $-23.25$ degrees and a radius of $-54.72$; partially reflective mirror segment 480 has a freeform shape defined by equations 2 and 3 below with coefficient values of $x^2=0.0046$, $y^2=0.0053$, with a relative tilt of $-26$ degrees and a radius of $-51.42$; and input coupler 497 has a freeform shape defined by equations 2 and 3 below with coefficient values of $x^2=-0.0053$, $y^2=-0.0027$, $x^3=7.14\text{E}-005$, $x^2y=-6.07\text{E}-6$, $xy^2=5.22\text{E}-5$, $(x,y,z)=(-28.5, 0, -3)$ with a relative tilt of 42.98 degrees and a radius of $-62.43$. Of course, other coefficient values and dimensions may be implemented.

$$z = \frac{cr^2}{1+\sqrt{1-(1+k)c^2r^2}} + \sum_{j=2}^{66} C_j x^m y^n, \quad \text{(Equation 2)}$$

$$j = \frac{(m+n)^2 + m + 3n}{2} + 1. \quad \text{(Equation 3)}$$

Figure 5A:
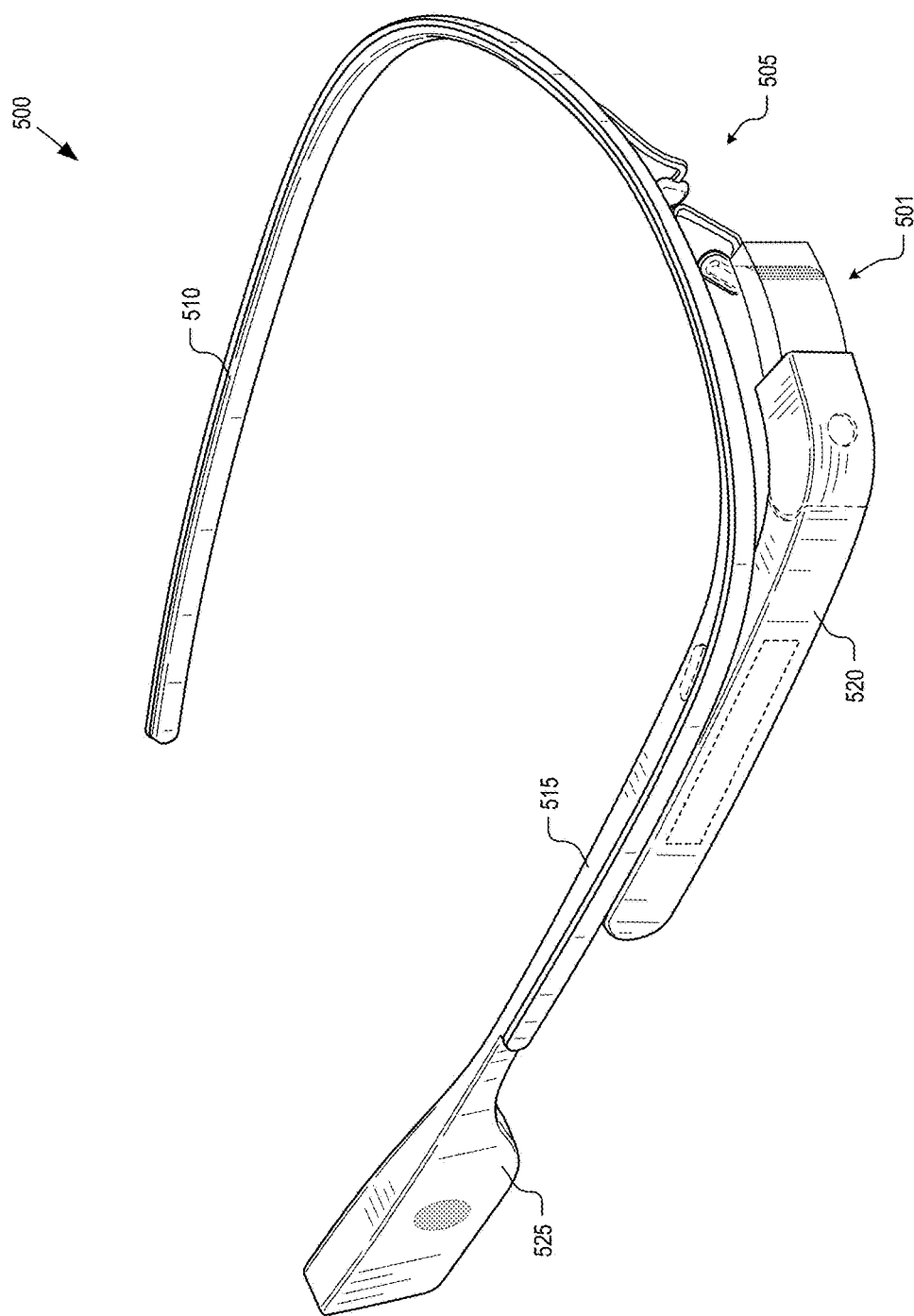
FIGS. 5A and 5B illustrate a demonstrative monocular head wearable display including a see-through eyepiece, in accordance with an embodiment of the disclosure.
Figure 5B:
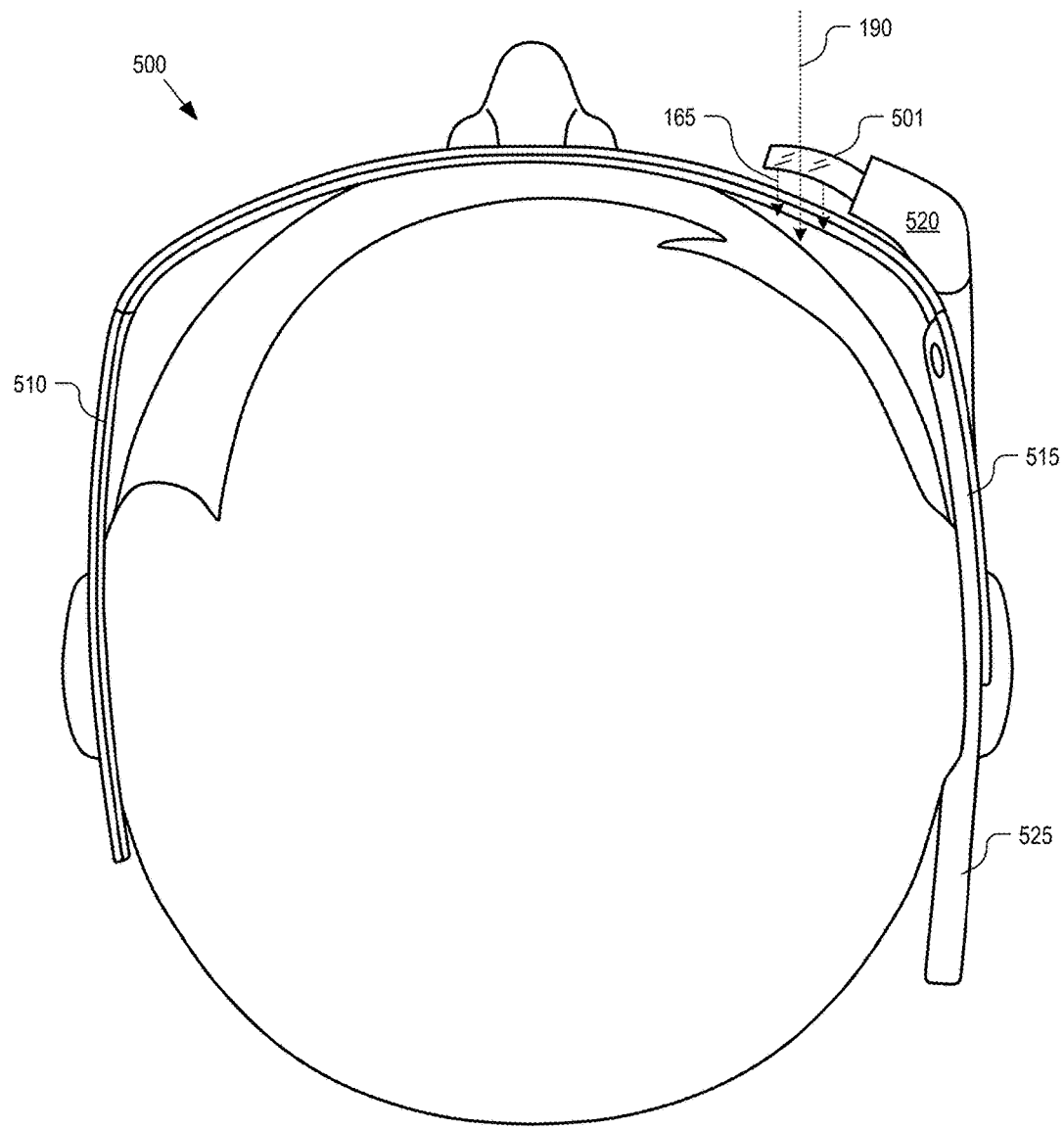

FIGS. 5A and 5B illustrate a monocular head wearable display 500 using an eyepiece 501, in accordance with an embodiment of the disclosure. FIG. 5A is a perspective view of head wearable display 500, while FIG. 5B is a top view of the same. Eyepiece 501 may be implemented with embodiments of eyepieces 100, 200, or 300 as discussed above (or combinations thereof). Eyepiece 501 is mounted to a frame assembly, which includes a nose bridge 505, left ear arm 510, and right ear arm 515. Housings 520 and 525 may contain various electronics including a microprocessor, interfaces, one or more wireless transceivers, a battery, a camera, a speaker, a display source, etc. Although FIGS. 5A and 5B illustrate a monocular embodiment, head wearable display 500 may also be implemented as a binocular display with two eyepieces 501 each aligned with a respective eye of the user when display 500 is worn.

The see-through eyepiece 501 is secured into an eye glass arrangement so head wearable display can be worn on the head of a user. The left and right ear arms 510 and 515 rest over the user's ears while nose bridge 505 rests over the user's nose. The frame assembly is shaped and sized to position viewing region 175 in front of an eye of the user. Other frame assemblies having other shapes may be used (e.g., traditional eyeglasses frame, a single contiguous headset member, a headband, goggles type eyewear, etc.).

Figure 6:
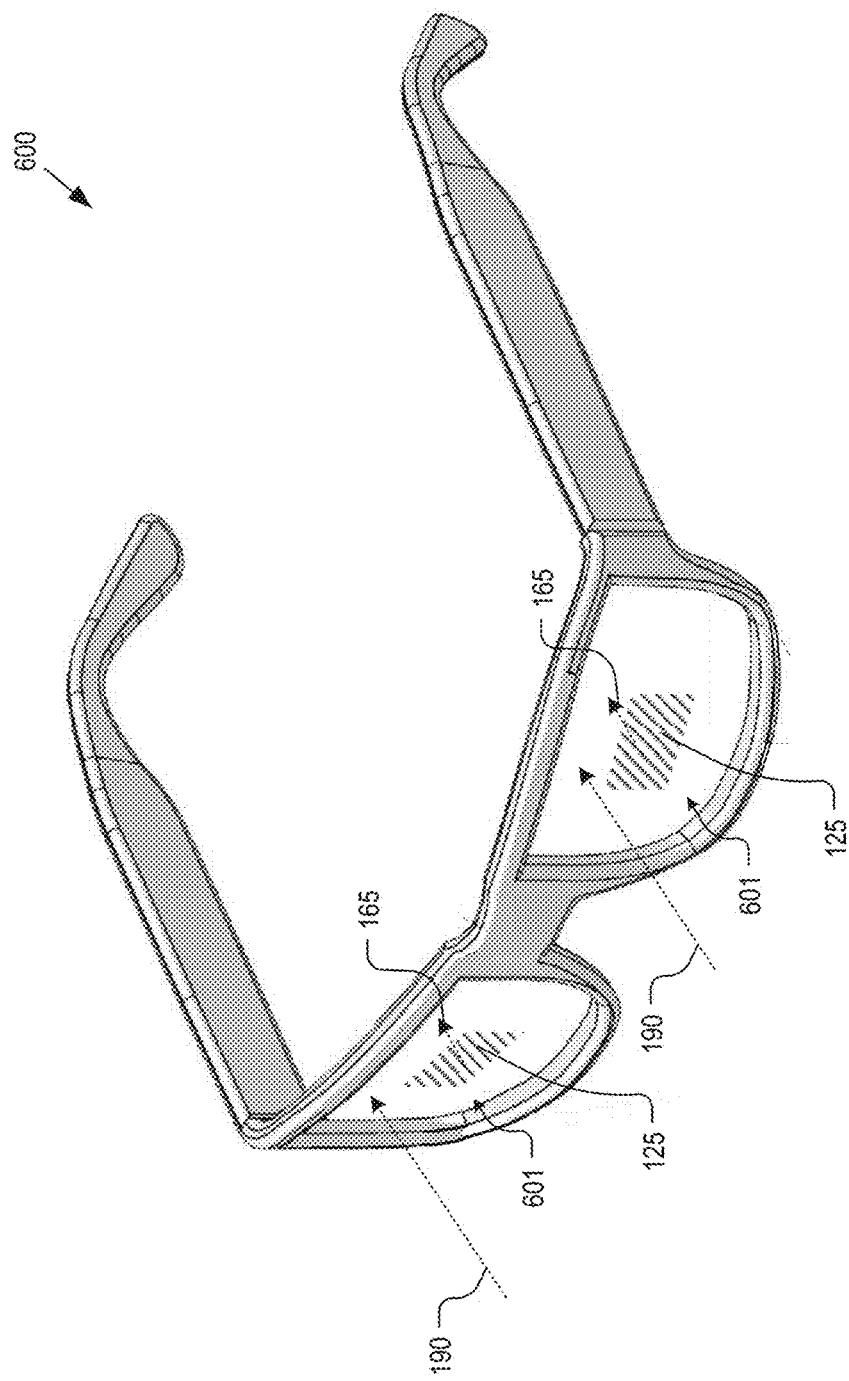
FIG. 6 illustrates a demonstrative binocular head wearable display including see-through eyepieces, in accordance with an embodiment of the disclosure.

As mentioned, FIGS. 5A and 5B illustrate a monocular embodiment with a compact see-through eyepiece that only covers a portion of the user's field of view. In other embodiments, the eye-facing and world facing surfaces of the see-through eyepiece can be extended to form full eyeglass lenses in a binocular frame. FIG. 6 illustrates a binocular head wearable display 600 including two see-through eyepieces 601 integrated into a frame and which eyepieces extend across a substantial portion of the user's field of view. The curved see-through component (e.g., curved see-through component 110 in FIG. 1) of each eyepiece 601 may be designed to extend across the entire eyepiece so that no seam is formed in the middle portion of the eyepiece. Display light 165 may be launched into eyepieces 601 at the peripheral temple regions and guided towards out couplers 125 via light guiding layers 115 using TIR or angle selective reflections, as described above. In one embodiment, head wearable display 600 may be implemented as a monocular design where just one eyepiece operates as an optical combiner while the other eyepiece is a regular lens of the same material and thickness.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
   a curved lightguide component for guiding display light received at an input region peripherally located from a viewing region and releasing the display light along an eye-ward direction in the viewing region, the curved lightguide component having an eye-facing side and a world-facing side, wherein the curved lightguide component has a thick portion that extends across a part of the eyepiece then transitions to a thin portion that extends across a remainder of the eyepiece, wherein the thick portion and the thin portion are of constant width along a chord line extending from an input coupler to an output coupler for at least a non-zero distance, and wherein the curved lightguide component extends across the eyepiece;
   the output coupler disposed where the thick portion of the curved lightguide component transitions to the thin portion of the curved lightguide component to redirect the display light towards the eye-ward direction for output from the curved lightguide component, wherein the output coupler is at least partially transmissive to ambient light incident through the world-facing side such that the viewing region is see-through;
   a curved see-through component mated to the world-facing side of the curved lightguide component; and
   a prescription layer having a first side and a second side, wherein the first side is mated to the eye-facing side of the curved lightguide component and the second side has a curvature that introduces prescriptive lensing to both the ambient light and the display light exiting the eyepiece in the viewing region.

2. The eyepiece of claim 1, further comprising:
   a first adhesive layer disposed between the prescription layer and the curved lightguide component to form a conformal bond that extends across both the thick and thin portions of the curved lightguide component, wherein the first adhesive layer has a first refractive index that is lower than a second refractive index of the curved lightguide component such that the display light is guided by total internal reflection ("TIR") from the input region to the viewing region along an interface between the first adhesive layer and the curved lightguide component.

3. The eyepiece of claim 2, further comprising:
a second adhesive layer disposed between the curved lightguide component and the curved see-through component, the second adhesive layer having the first refractive index that is lower than the second refractive index,
wherein the display light is guided between the input region and the output coupler entirely by TIR.

4. The eyepiece of claim 1, further comprising:
a first angularly selective coating disposed between the first side of the prescription layer and the eye-facing side of the curved lightguide to guide the display light from the input region to the viewing region along a first interface between the prescription layer and the curved lightguide component; and
a second angularly selective coating disposed along a second interface between the world-facing side of the curved lightguide component and the curved see-through component to guide the display light from the input region to the viewing region along the second interface.

5. The eyepiece of claim 1, wherein a second refractive index of the curved lightguide component is substantially equivalent to a third refractive index of the curved see-through component.

6. The eyepiece of claim 5, wherein a combination of the curved lightguide component and the curved see-through component does not introduce optical power to the ambient light passing through the viewing region of the eyepiece while the prescription layer does introduce the prescriptive lensing to the ambient light passing through the viewing region.

7. The eyepiece of claim 1, wherein the curved see-through component has a thin portion and a thick portion, wherein the thin portion of the curved see-through component conformably mates to the thick portion of the curved lightguide component and wherein the thin portion of the curved lightguide component conformably mates to the thick portion of the curved see-through component, and wherein the output coupler is disposed at a transition from the thick portions to the thin portions at an interface between the curved see-through component and the curved lightguide component.

8. The eyepiece of claim 1, wherein the output coupler comprises one of a freeform partially reflective surface, a diffraction grating, an array of prism structures, a hologram, or a plurality of partially reflective mirror segments.

9. The eyepiece of claim 1, further comprising:
an input coupler disposed at the input region to couple the display light into the curved lightguide component, wherein the input coupler is arranged in the thick portion of the curved lightguide component.

10. The eyepiece of claim 1, wherein the curved see-through component and the prescription layer extend over the entire area of the eyepiece without forming any seams in a middle portion of the eyepiece.

11. The eyepiece of claim 1, wherein a combination of the eye-facing side of the curved lightguide, the world-facing side of the curved lightguide, an input coupler of the curved lightguide, and the output coupler provide lensing power to the display light.

12. A head wearable display, comprising:
a display source to generate display light at a peripheral location;
an eyeglass lens including:
a curved lightguide component for guiding the display light received at an input region peripherally located from a viewing region and releasing the display light along an eye-ward direction in the viewing region, the curved lightguide component having an eye-facing side and a world-facing side, wherein the curved lightguide component has a thick portion that transitions to a thin portion, and wherein the thick portion and the thin portion are of constant width along a chord line extending from an input coupler to an output coupler for at least a non-zero distance, and wherein the curved lightguide component extends across the eyepiece;
the output coupler disposed at the viewing region to redirect the display light towards the eye-ward direction for output from the curved lightguide component, wherein the output coupler is at least partially transmissive to ambient light incident through the world-facing side such that the viewing region is see-through;
a curved see-through component mated to the world-facing side of the curved lightguide component, wherein the curved see-through component has a thick portion that transitions to a thin portion, and wherein the see-through component extends across the eyepiece,
wherein the thick portion of the curved lightguide component is arranged to comfortably mate with the thin portion of the curved see-through component, and wherein the thin portion of the curved lightguide component is arranged to comfortably mate with the thick portion of the curved see-through component, and
wherein the output coupler is disposed where the thick portion of the curved lightguide component transitions to the thin portion of the curved lightguide component;
a prescription layer having a first side and a second side, wherein the first side is mated to the eye-facing side of the curved lightguide component and the second side has a curvature that introduces prescriptive lensing to both the ambient light and the display light exiting the eyeglass lens in the viewing region; and
a frame assembly to support the eyeglass lens and the display source for wearing on a head of a user with the viewing region positioned in front of an eye of the user.

13. The head wearable display of claim 12, wherein the eyeglass lens further comprises:
a first adhesive layer disposed between the prescription layer and the curved lightguide component to form a conformal bond, wherein the first adhesive layer has a first refractive index that is lower than a second refractive index of the curved lightguide component such that the display light is guided by total internal reflection ("TIR") from the input region to the viewing region along an interface between the first adhesive layer and the curved lightguide component.

14. The head wearable display of claim 13, wherein the eyeglass lens further comprises:
a second adhesive layer disposed between the curved lightguide component and the curved see-through component, the second adhesive layer having the first refractive index that is lower than the second refractive index, wherein the display light is guided between the input region and the output coupler entirely by TIR.

15. The head wearable display of claim 12, wherein the eyeglass lens further comprises:
- a first angularly selective coating disposed between the first side of the prescription layer and the eye-facing side of the curved lightguide to guide the display light from the input region to the viewing region along a first interface between the prescription layer and the curved lightguide component; and
- a second angularly selective coating disposed along a second interface between the world-facing side of the curved lightguide component and the curved see-through component to guide the display light from the input region to the viewing region along the second interface.

16. The head wearable display of claim 12, wherein a combination of the curved lightguide component and the curved see-through component do not introduce optical power to the ambient light passing through the viewing region of the eyeglass lens while the prescription layer does introduce the prescriptive lensing to the ambient light passing through the viewing region.

17. An eyepiece for a head wearable display, the eyepiece comprising:
- a curved lightguide component for guiding display light received at an input region peripherally located from a viewing region and emitting the display light along an eye-ward direction in the viewing region, the curved lightguide component having an eye-facing side and a world-facing side, wherein the curved lightguide component has a thick portion that transitions to a thin portion, and wherein the thick portion and the thin portion are of constant width along a chord line extending from and input coupler to an output coupler for at least a non-zero distance, and wherein the curved lightguide component extends across the eyepiece, wherein the viewing region is arranged where the thick portion transitions to the thin portion, and wherein the display light is guided from the input region to the viewing region in the thick portion of the curved lightguide component;
- the output coupler disposed where the thick portion of the curved lightguide component transitions to the thin portion of the curved lightguide component to redirect the display light towards the eye-ward direction for output from the curved lightguide component, wherein the output coupler is at least partially transmissive to ambient light incident through the world-facing side such that the viewing region is see-through, wherein the output coupler is disposed where the thick portion of the curved lightguide component transitions to the thin portion of the curved lightguide component; and
- a curved see-through component having a first side and a second side, wherein the first side is mated to the world-facing side of the curved lightguide component, wherein the curved see-through component has a thick portion that transitions to a thin portion, and wherein the see-through component extends across the eyepiece, wherein the thick portion of the curved lightguide component is arranged to comformably mate with the thin portion of the curved see-through component, and wherein the thin portion of the curved lightguide component is arranged to comformably mate with the thick portion of the curved see-through component, and wherein one of the second side of the curved see-through component or the eye-facing side of the curved lightguide component has a prescriptive curvature that introduces prescriptive lensing.

18. The eyepiece of claim 17, further comprising:
an adhesive layer disposed between the curved lightguide component and the curved see-through component to form a conformal bond, wherein the adhesive layer has a first refractive index that is lower than a second refractive index of the curved lightguide component such that the display light is guided by total internal reflection ("TIR") from the input region to the viewing region along an interface between the adhesive layer and the curved lightguide component.

19. The eyepiece of claim 17, further comprising:
- a first angularly selective coating disposed between the curved lightguide component and the curved see-through component to guide the display light from the input region to the viewing region; and
- a second angularly selective coating disposed along the eye-facing side of the curved lightguide component to guide the display light from the input region to the viewing region.

20. The eyepiece of claim 17, wherein only the second side of the curved see-through component has the prescriptive curvature that introduces prescriptive lensing to just the ambient light passing through the eyepiece without introducing prescriptive lensing to the display light emitted from the eyepiece.

* * * * *